United States Patent [19]
McEathron

[11] 3,966,270
[45] June 29, 1976

[54] FLUID BRAKE CONTROL SYSTEM

[75] Inventor: Eugene Douglas McEathron, Watertown, N.Y.

[73] Assignee: General Signal Corporation, Rochester, N.Y.

[22] Filed: Aug. 13, 1975

[21] Appl. No.: 604,404

[52] U.S. Cl. .................................. 303/69; 303/66
[51] Int. Cl.² ....................................... B60T 15/32
[58] Field of Search .................. 303/59, 68, 69, 64, 303/66

[56] References Cited
UNITED STATES PATENTS

| | | | |
|---|---|---|---|
| 2,077,930 | 4/1937 | Hewitt | 303/69 |
| 2,392,185 | 1/1946 | Pickert | 303/68 |

*Primary Examiner*—Duane A. Reger
*Attorney, Agent, or Firm*—Harold S. Wynn

[57] ABSTRACT

A fluid brake control system is disclosed having a brake application and release control device for governing fluid pressure in a brake cylinder. The control device comprises a housing containing a differential abutment subject to actuation from a normal position by differences in pressure between respective brake pipe and reference fluid pressure chambers on opposite sides of the abutment. At least one poppet type valve is provided in the housing on each side of the abutment, that is spring biased in the direction of the abutment to a closed position, having an operating push rod axially disposed between the associated poppet valve and the abutment. The poppet valve on one side of the abutment is opened by movement of the abutment in one direction from its normal position to permit charging of the brake cylinder pipe and the poppet valve on the other side of the abutment is opened by movement of the abutment in the opposite direction from its normal position to permit fluid to be released from the brake cylinder pipe.

7 Claims, 1 Drawing Figure

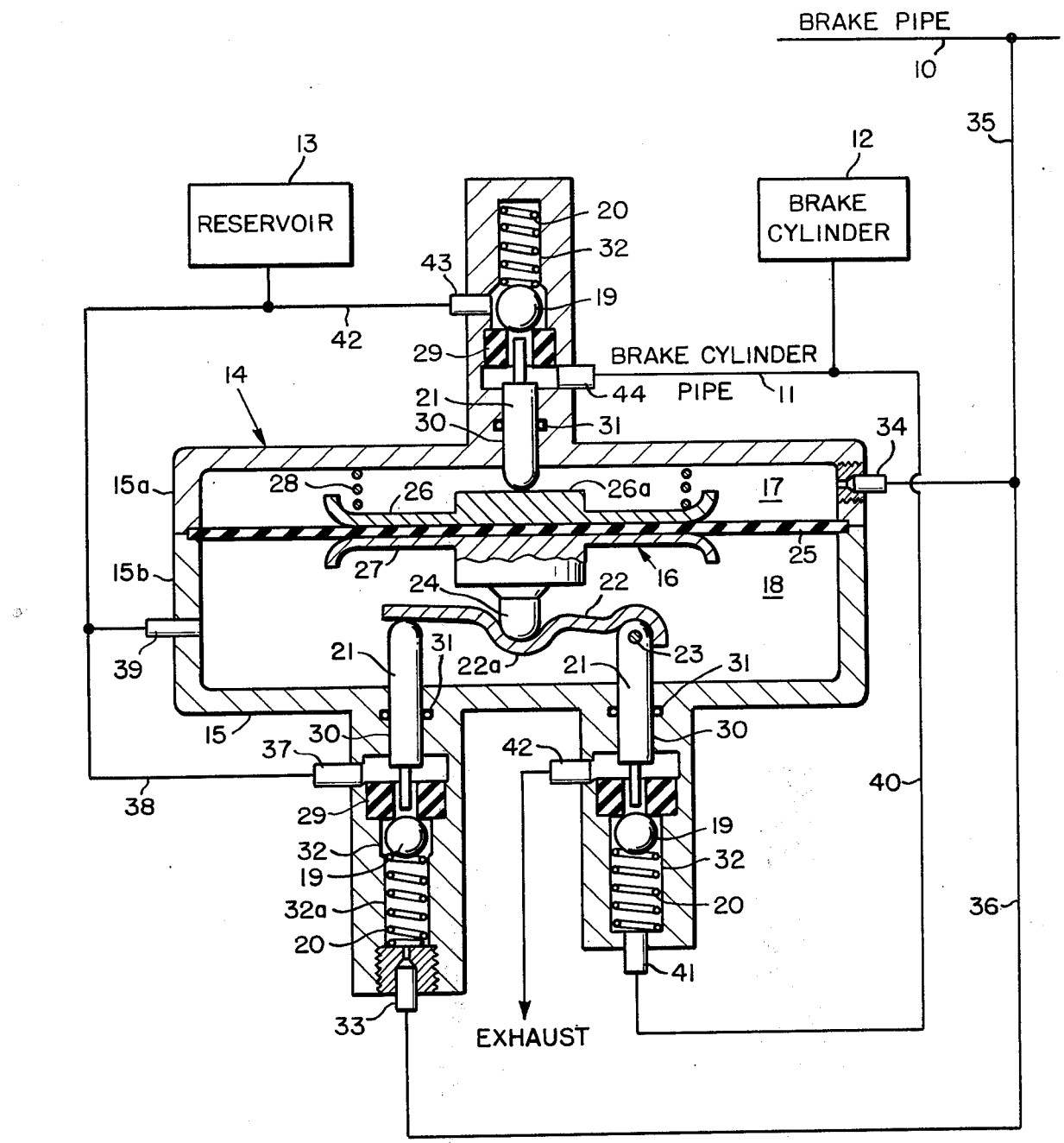

FLUID BRAKE CONTROL SYSTEM

BACKGROUND OF INVENTION

This invention relates to fluid brake control systems, and while the invention is subject to a wide range of applications, a preferred embodiment of the invention will be particularly described as applied to a fluid brake control system having a brake application and release control device including a plurality of poppet type valves.

The present invention is an improvement over currently used brake application and control devices such as the service slide valve of the well-known ABD control valve generally used for governing service application and release of brakes of freight cars. This service slide valve is operated by a differential abutment comparing auxiliary reservoir and brake pipe pressures in respective chambers on opposite sides of the abutment which actuates the slide valve selectively to different control positions for respectively charging reservoirs, applying pressure to a brake cylinder, and releasing pressure from the brake cylinder. These valves are costly to manufacture, and are somewhat slow to respond because of sliding friction.

Smooth and efficient application and release of brakes of a train is dependent upon the speed at which a change in control is passed along from car to car, beginning at the front end of a train. It is therefore very important that there be as little delay as possible in the successive operation of the service valves for the respective cars of a train. It is therefore highly desirable to increase the speed of propagation of a braking change through a train over the rate of operation currently possible with ABD service slide valves.

An object of the present invention is to provide a fluid brake control system having an improved brake application and release control device which substantially obviates one or more of the limitations and disadvantages of the described prior systems.

Another object of the present invention is to provide a fast operating brake application and release control device.

Another object of the present invention is to reduce manufacturing and maintenance cost of a brake application and release control device.

Other objects, purposes and characteristic features of the present invention will be in part obvious from the accompanying drawing, and in part pointed out as the description of the invention progresses.

SUMMARY OF INVENTION

A fluid brake control system is provided for a vehicle having a brake control pipe, a brake cylinder pipe governing fluid pressure in a brake cylinder and a reference fluid pressure reservoir wherein an improved brake application and release control device is provided for governing fluid pressure in the brake cylinder pipe. The control device has a housing containing a differential abutment subject to actuation axially from a normal position by differences in pressure between respective brake pipe and reference fluid pressure chambers on opposite sides of the abutment. At least one poppet type valve is provided in the housing on each of the opposite sides of the abutment and is spring biased in the direction of the abutment to a closed position. Each of the poppet type valves has an operating push rod axially disposed between the associated valve and the abutment to be actuated by movement of the abutment. The poppet valve on one side of the abutment is opened by movement of the abutment in one direction from its normal position to permit charging of the brake cylinder pipe, and the poppet valve on the other side of the abutment can be opened by movement of the abutment in the opposite direction to permit fluid to be released from the brake cylinder.

A second poppet valve is disposed on the same side of the abutment as the valve governing release of fluid from the brake cylinder for governing the charging of the brake reservoirs. A bridge is disposed across ends of the push rods on the same side of the abutment and adapted at a mid-position for actuation by movement of the abutment.

This structure provides an application and release control device that is both sensitive and efficient in its operation because of reduced friction and balanced loading so as to substantially reduce the time consumed in controlling the brakes of a train.

For a better understanding of the present invention, together with other and further objects thereof, reference is had to the following description taken in connection with the accompanying drawing, while its scope will be pointed out in the appending claims.

The accompanying drawing is a sectional view of a brake application and release control device together with a schematic diagram of a fluid brake control system in which it can be used as a preferred embodiment of the present invention.

With reference to the drawing, a fluid brake control system is provided for a vehicle having a brake control pipe 10, a brake cylinder pipe 11 delivering fluid to a brake cylinder 12, and a reference fluid pressure reservoir 13. An improved brake application and release control device 14 is provided for governing fluid pressure in the brake cylinder pipe 11.

The brake application and release control device 14 has a housing 15 containing a differential abutment 16 subject to actuation from a normal position by differences in pressure between respective brake pipe and reference fluid pressure chambers 17 and 18 on opposite sides of the abutment 16.

At least one poppet valve 19 is provided in the housing 15 on each of the opposite sides of the abutment 16 biased by a spring 20 in the direction of the abutment 16 to a closed position and having an operating push rod 21 axially disposed between the associated valve 19 and the abutment 16. The poppet valve 19 on the upper side of the abutment 16 is opened for movement of the abutment 16 upwardly from its normal position to permit charging of the brake cylinder pipe 11, and one of the poppet valves 19 on the lower side of the abutment 16 is opened by movement of the abutment 16 downwardly from its normal position to permit fluid to be released from the brake cylinder pipe 11.

Another poppet valve 19 is provided on the lower side of the abutment 16 and is biased by a spring 20 in the direction of the abutment 16 to a closed position, having an operating pusher rod 21 axially disposed between this valve 19 and the abutment 16 and operable by movement of the abutment 16 downwardly to permit charging of the reservoir 13.

The laterally spaced push rods 21 of the valves beneath the abutment 16 are connected as their upper ends by a bridge 22 that is pivotally connected to the right-hand push rod 21 by a pin 23. At a mid-point in the bridge 22, the bridge 22 is recessed downwardly at 22a to receive a detent 24 in abutment 16.

Abutment 16 comprises an annular diaphragm 25 secured between upper and lower housing portions 15a and 15b respectively and annular diaphragm follower plates 26 and 27 secured on upper and lower sides respectively of the diaphragm 25. The plate 26 has a bearing surface 26a for the lower end of the push rod 21 above the abutment 16. Similarly, the plate 27 below the diaphragm 25 has a detent 24 formed therein for engagement with bridge 22 as has been described to actuate the push rods 21 of the valves below the abutment 16.

A light stabilizing spring 28 is preferably disposed between plate 26 and the upper housing portion 15a as illustrated to provide smoother and more positive operation of the abutment 16. It will be noted that the springs 28 and 20 above the abutment 16 can be adjusted to provide substantially the same biasing force for restoring the abutment 16 to its normal position as would be provided by the two springs 20 of the valves 19 on the lower side of the abutment 16. Thus the valve can be adjusted, if desired, so that substantially the same difference in pressure in one direction is required to open the valve above the abutment 16 that is required in the opposite direction to open the valves below the abutment 16, or an inbalance in bias can be provided across abutment 16 in accordance with the requirements of practice. A movement of the abutment 16 only about 0.05 of an inch away from its normal position is sufficient for operation of the valves 19, and thus the flat diaphragm 25 is sufficient as compared to a more expensive cone type diaphragm that is required for the materially greater extent of movement required of the abutment in the conventional service slide valve currently being used.

Each of the valves 19 is similar in that it is a poppet valve of the ball type urged by a spring 20 against one end of a tubular resilient seat 29. Each of the push rods 21 for operating its associated valve 19 is operable with minimum friction within a bore 30 in the housing 15, and an O-ring 31 is used to prevent leakage from the pressure chambers 17 and 18. The push rods 21 are of reduced diameter at their ends adjoining the valves 19 to permit free passage of fluid through the associated valve when the valve is opened. The valve springs 20 are contained in suitable bores 32 in the casing 15.

The lower left-hand valve 19 is preferably made double acting by its associated bore 32 being tapered inwardly at 32a for the purpose of retarded charging of the reservoir 13 as will be hereinafter more fully considered. A choke 33 is also provided for governing the rate of charging of reservoir 13. A choke 34 is preferably provided for governing the rate of flow between the brake pipe 10 and chamber 17.

In practice, the control device 14 that has been described can be used in place of the service slide valve in an ABD valve to control the brakes of a freight car. Thus it should be considered that the abbreviated disclosure of the braking system is done to simplify the disclosure of the invention rather than to limit the environment in which the invention may be applied. For example, additional controls can be provided in the brake cylinder pipe according to the requirements of practice and according to the ABD valve control system, and additional brake pipe pressure governed controls and reservoir charging circuits can also be provided as in the ABD valve control system.

Upon initially charging the brake pipe 10, fluid enters the chamber 17 through choke 34 and increases to a level sufficient to deflect the abutment 16 downwardly, opening the lower left-hand valve 19 and charging reservoir 13 from fluid in the brake pipe 10 over passages 35 and 36, through choke 33 and valve 19 to the outlet port 37 and through passage 38 to reservoir 13 and also to charge the chamber 18 through port 39. If pressure in chamber 17 increases faster than pressure in chamber 18, as can be the case for cars near the front of a train, the abutment 16 is moved still further to actuate the left-hand valve 19 to its retarded charging position by partially closing the tapered throat of bore 32 at 32a. This is done to retard the charging of the reservoirs 13 of cars at the head of a train to permit a more uniform charging of the reservoirs throughout the train. valves During the charging operation, the lower right-hand valve 19 is also opened to connect the brake cylinder 12 through brake cylinder pipe 11 to atmosphere including passage 40, supply port 41 and exhaust port 42 of the right-hand valve 19 in its open position. As the difference in pressure between the chambers 17 and 18 is reduced by the charging operation, the abutment 16 becomes restored to its normal position as illustrated, and the lower valves 19 becomes closed.

With the system fully charged, a brake application can be effected by reduction of pressure in the brake pipe 10. Such reduction is sensed by an imbalance of forces across the diaphragm 25 resulting in deflection of the abutment 16 upwardly. This opens the valve 19 and permits fluid to flow from the reservoir 13 to the brake cylinder pipe 11 and thus to brake cylinder 12. Fluid pressure is applied from reservoir 13 over passage 42, supply port 43, open valve 19 and output port 44 to the brake cylinder pipe 11. The brake cylinder 12 continues to be charged in this way until a balance is restored in pressures of chambers 17 and 18 across the diaphragm 25 to restore the abutment 16 to its normal position and thus close the upper valve 19.

To release the brakes, pressure is increased in the brake pipe 10 and the increased pressure is sensed in control device 14 to move abutment 16 downwardly to open the two lower valves 19 and thus vent the brake cylinder 12 to atmosphere through restricted venting (not shown) while recharging reservoirs, including reservoir 13. When the brake pipe 10 becomes recharged to its normal pressure, the pressures become equalized across the abutment 16, thus restoring abutment 16 to its normal position and closing the lower valves 19.

It will be apparent from the embodiment as described that the control device 14 is quick to respond because of minimum friction in operating the poppet valves 19, and because of a minimum amount of travel of the abutment 16 being required. The abutment 16 has opposing poppet valve springs 20 on opposite sides of the abutment 16 that can offer substantially the same bias resistance to movement of the abutment by differential fluid pressures in either direction, thus providing good response to differential pressure across diaphragm 25 in either direction.

Having thus described a fluid brake control system for a vehicle having an improved brake application and release control device as a preferred embodiment of the present invention, it is to be understood that various modifications and alterations may be made to the specific embodiment shown without departing from the spirit or scope of the invention.

What is claimed is:

1. A fluid brake control system for a vehicle having a brake pipe, a brake cylinder pipe governing fluid pressure in a brake cylinder, and a reference fluid pressure reservoir wherein an improved brake application and release control device is provided for governing fluid pressure in the brake cylinder pipe comprising;
    a. a housing containing a differential abutment subject to actuation from a normal position by differences in pressure between respective brake pipe and reference fluid pressure chambers on opposite sides of the abutment,
    b. at least one poppet type valve means disposed in the housing on each of said opposite sides of the abutment spring biased in the direction of the abutment to a closed position and the valve means having an operating push rod axially disposed between the associated valve means and the abutment,
    c. the poppet valve means on one side of the abutment being opened by movement of the abutment in one direction from its normal position to permit charging of the brake cylinder pipe, and
    d. the poppet valve means on the other side of the abutment being opened by movement of the abutment in the opposite direction from its normal position to permit fluid to be released from the brake cylinder pipe.

2. A fluid brake control system according to claim 1 wherein the poppet valve means are of the spring biased ball closure type.

3. A fluid brake control system according to claim 1 wherein the improved brake application and release valve comprises a second poppet type valve means on said other side of the abutment spring biased in the direction of the abutment to a closed position and having an operating rod axially disposed between said second valve means and the abutment operable by movement of the abutment in said other direction to permit charging of the reservoir.

4. A fluid brake control system according to claim 3 wherein the second poppet type valve means is double acting to additionally restrict flow of fluid upon extended actuation of the abutment in said other direction.

5. A fluid brake control system for a vehicle according to claim 3 wherein the push rods for actuating the valve means on said other side of the abutment are laterally disposed and connected across their ends by a bridge which is adapted at an intermediate point for actuation by the abutment.

6. A fluid brake control system according to claim 5 wherein the bridge is pivotally connected to one of the push rods.

7. A fluid brake control system according to claim 5 wherein the bridge is recessed at said intermediate point and the abutment has a cooperating detent receivable in the recess.

* * * * *